United States Patent
Brown

(10) Patent No.: US 11,269,183 B2
(45) Date of Patent: Mar. 8, 2022

(54) DISPLAY INFORMATION ON A HEAD-MOUNTABLE APPARATUS CORRESPONDING TO DATA OF A COMPUTING DEVICE

(71) Applicant: Microsoft Technology Licensing, LLC, Redmond, WA (US)

(72) Inventor: Benjamin Eli Brown, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 55 days.

(21) Appl. No.: 16/683,892

(22) Filed: Nov. 14, 2019

(65) Prior Publication Data
US 2021/0149200 A1    May 20, 2021

(51) Int. Cl.
*G02B 27/01* (2006.01)
*G06T 19/00* (2011.01)
*G09G 5/00* (2006.01)

(52) U.S. Cl.
CPC ..... *G02B 27/0172* (2013.01); *G02B 27/0101* (2013.01); *G06T 19/006* (2013.01); *G02B 2027/0138* (2013.01); *G02B 2027/0141* (2013.01)

(58) Field of Classification Search
CPC ............ G02B 27/0172; G02B 27/0101; G02B 2027/0138; G02B 2027/0141; G06T 19/006
USPC ............................................................ 345/8
See application file for complete search history.

(56) References Cited

U.S. PATENT DOCUMENTS

| | | | |
|---|---|---|---|
| 8,866,849 B1 | 10/2014 | Cho et al. | |
| 9,769,395 B2 | 9/2017 | Russell | |
| 10,152,141 B1 | 12/2018 | Lohse et al. | |
| 2014/0063061 A1* | 3/2014 | Reitan | G09G 3/003 345/633 |
| 2015/0348322 A1 | 12/2015 | Ligameri et al. | |
| 2016/0286164 A1 | 9/2016 | Kratz et al. | |
| 2017/0323481 A1* | 11/2017 | Tran | H04N 5/23212 |

(Continued)

FOREIGN PATENT DOCUMENTS

EP    3096207 A1    11/2016

OTHER PUBLICATIONS

"International Search Report and Written Opinion Issued in PCT Application No. PCT/US2020/057264", dated Feb. 5, 2021, 15 Pages.

*Primary Examiner* — Kwin Xie
(74) *Attorney, Agent, or Firm* — Mannava & Kang, P.C.

(57) ABSTRACT

According to examples, an apparatus may include a camera, a transparent panel, and a processor being mounted on a housing to be mounted on a user's head. The processor may access an image captured by the camera of a label and spatial markers displayed on a screen of a computing device, determine data identified in the label, communicate the determined data to an information source, receive, from the information source, information corresponding to the determined data, determine locations of the spatial markers with respect to a display area of the panel, identify a section of the display area defined by the spatial markers, and display an item corresponding to the received information on the panel outside of the identified section.

17 Claims, 5 Drawing Sheets

(56) References Cited

U.S. PATENT DOCUMENTS

| | | | | |
|---|---|---|---|---|
| 2017/0344124 A1* | 11/2017 | Douxchamps | ........ | G06F 3/0426 |
| 2018/0061138 A1* | 3/2018 | Neeter | .................. | G06T 19/00 |
| 2018/0218538 A1* | 8/2018 | Short | .................. | G02B 27/017 |
| 2019/0244425 A1* | 8/2019 | Koohmarey | .......... | G06T 19/006 |
| 2019/0371028 A1* | 12/2019 | Harrises | ............ | G02B 27/0101 |

* cited by examiner

DISPLAY INFORMATION ON A HEAD-MOUNTABLE APPARATUS CORRESPONDING TO DATA OF A COMPUTING DEVICE

BACKGROUND

A head-mounted electronic device may include a display that may be positioned near the eyes of a user of the head-mounted electronic device. In some devices, images that may augment real-world objects viewable through the panel may be displayed on the panel. The user of the head-mounted electronic device may thus view both real-world objects through the panel and augmented reality images on the panel.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1A:
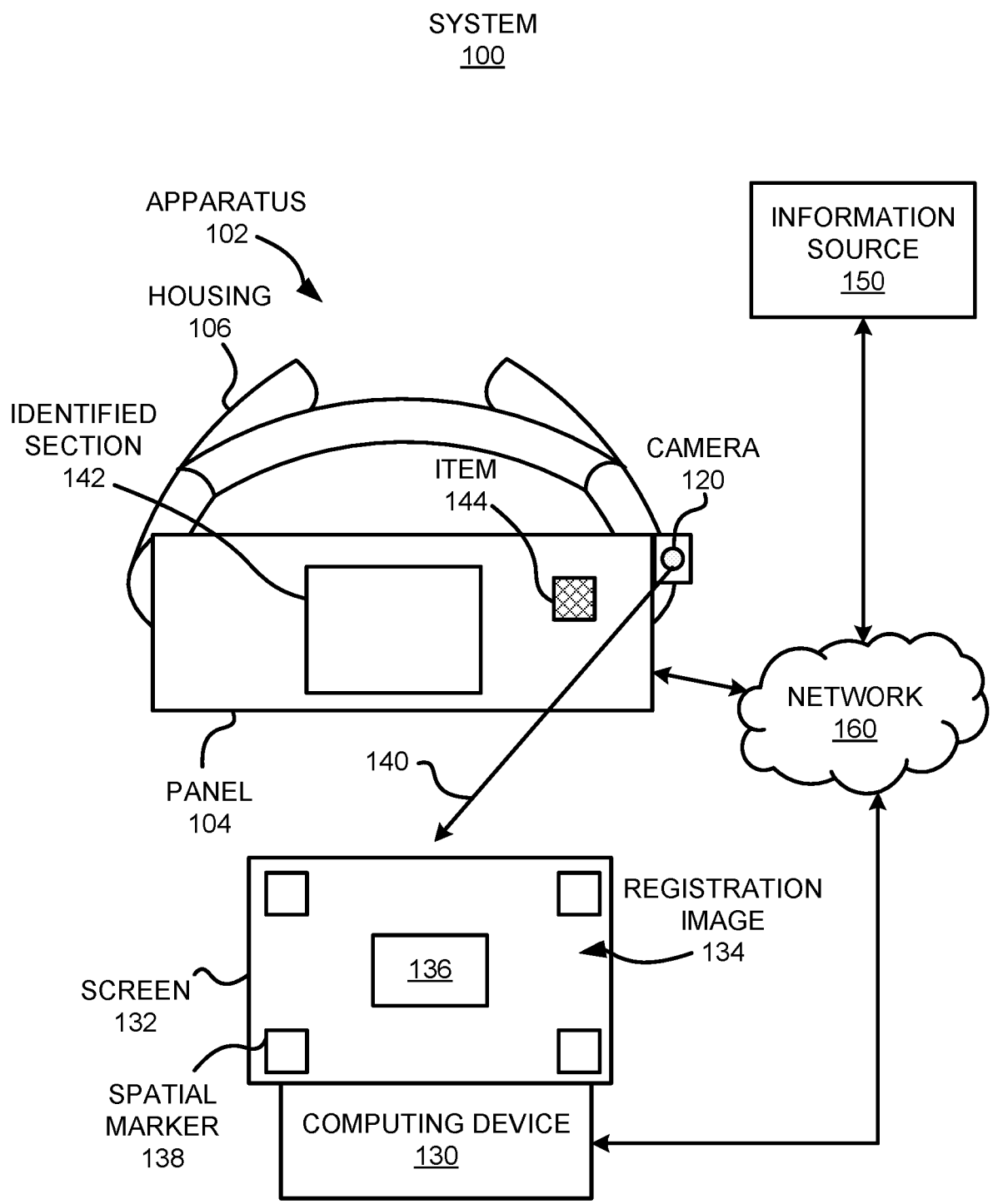
FIG. 1A shows a block diagram of a system that may include an apparatus, in which the apparatus may include a panel on which images that may augment views of real-world objects may be displayed for viewing by a user of the apparatus, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, head-mountable apparatuses, and methods, for registering the apparatuses with a computing device and controlling display of items on a panel of the head-mountable apparatus and a screen of the computing device. Particularly, an apparatus (and similarly, a head-mountable apparatus) disclosed herein may include a housing to be mounted on a user's head. In addition, a camera, a transparent panel, and a processor may be mounted on the housing.

As discussed herein, an information source may register the processor with a computing device such that the apparatus and the computing device may display data in a coherent fashion with respect to each other. Particularly, the computing device may cause a label including information pertaining to the computing device to be displayed on a screen and the camera may capture an image of the label. The processor may also identify the information pertaining to the computing device from the captured image of the label and may communicate the identified information to the information source. The processor may also communicate information pertaining to the apparatus, e.g., an identifier of the apparatus, such that the information source may register the apparatus with the computing device using identifiers of the apparatus and the computing device.

While the apparatus is registered with the computing device, the information source may correlate the display of items on the apparatus and the computing device. That is, for instance, the information source may instruct the apparatus to display a certain item and the computing device to display an item corresponding to the certain item depending upon a user input to the apparatus and/or the computing device. As discussed herein, the processor may identify a section of the panel through which the computing device screen is visible, e.g., as defined by a set of spatial markers displayed on the computing device screen, and may prevent a display of images in the identified section such that the computing device screen may remain visible through the panel. According to examples, the information source may cause an item and/or a corresponding item to be moved between computing device screen and a display area of the panel based on, for instance, user inputs.

According to examples, the panel may display images at a lower detail level than the computing device screen. As a result, items may be displayed on the panel at a relatively lower level of detail as compared with items displayed on the computing device screen. In addition, a user may have a greater level of control over items displayed on the computer device screen, e.g., through a keyboard, a mouse, etc., than over items displayed on the panel of the apparatus, e.g., hand gestures, voice commands, etc. As a result, a user may prefer to view certain items on the panel of the apparatus and may prefer to view other items on the computer device screen. Through implementation of the features of the present disclosure, a user may implement the displays of items on both a head-mountable apparatus panel and a computing device screen to realize benefits of both types of displays.

Figure 1B:
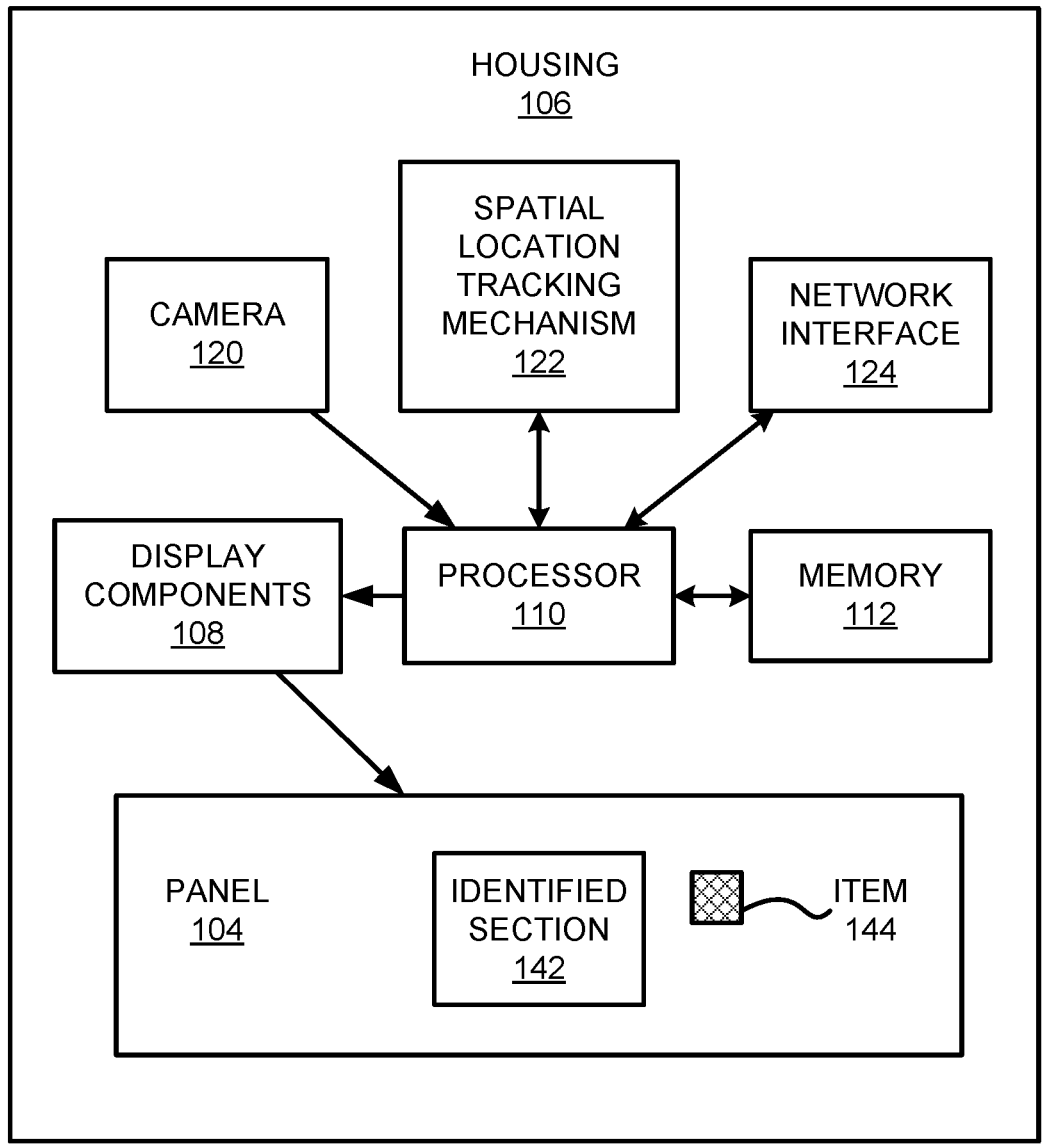
FIG. 1B shows a block diagram of the apparatus depicted in FIG. 1A, in accordance with an embodiment of the present disclosure.

Reference is first made to FIGS. 1A and 1B. FIG. 1A shows a block diagram of a system 100 that may include an apparatus 102, in which the apparatus 102 may include a panel 104 on which images that may augment views of real-world objects may be displayed for viewing by a user or wearer of the apparatus 102, in accordance with an embodiment of the present disclosure. FIG. 1B shows a block diagram of the apparatus 102 depicted in FIG. 1A, in accordance with an embodiment of the present disclosure. It should be understood that the system 100 and/or the apparatus 102 may include additional features and that some of the features described herein may be removed and/or modified without departing from the scopes of the system 100 and/or the apparatus 102.

The apparatus 102 may include a housing 106 on which the panel 104 may be mounted. The housing 106 may include a shape and a size for being placed and supported on a user's head with the panel 104 being positioned in front of or otherwise in a field of view of a user when properly supported on a user's head. In this regard, the apparatus 102 may be a head-mountable apparatus and the housing 106 may include a frame or other structure for being mounted on a user's head. In some examples, the housing 106 may be adjustable such that the housing 106 may fit on heads of different sizes. The housing 106 may be formed of any suitable materials including plastic, metals, ceramic, and/or the like.

The apparatus 102 may also include a processor 110 that may control operations of various components of the apparatus 102 and a memory 112 on which data that the processor 110 may access and/or execute may be stored. The processor 110 and the memory 112 may be mounted to and/or within the housing 106 such that, for instance, the processor 110 and the memory 112 may be integrated into the housing 106. The processor 110 may be a semiconductor-based microprocessor, a central processing unit (CPU), an application specific integrated circuit (ASIC), a field-programmable gate array (FPGA), and/or other hardware device. The memory 112, which may also be termed a computer readable medium, may be, for example, a Random Access memory (RAM), an Electrically Erasable Programmable Read-Only Memory (EEPROM), a storage device, or the like. The memory 112 may be a non-transitory computer readable storage medium, where the term "non-transitory" does not encompass transitory propagating signals. In any regard, the memory 112 may have stored thereon machine readable instructions that the processor 110 may execute to control various operations of the components in the apparatus 102.

Although the apparatus 102 is depicted as having a single processor 110, it should be understood that the apparatus 102 may include additional processors and/or cores without departing from a scope of the apparatus 102. In this regard, references to a single processor 110 as well as to a single memory 112 may be understood to additionally or alternatively pertain to multiple processors 110 and multiple memories 112. In addition, or alternatively, the processor 110 and the memory 112 may be integrated into a single component, e.g., an integrated circuit on which both the processor 110 and the memory 112 may be provided.

The apparatus 102 may further include a camera 120 and a spatial location tracking mechanism 122 mounted on and/or within the housing 106. The camera 120 may be positioned to capture images and/or video of an area directly in front of the apparatus 102. For instance, the camera 120 may be positioned on the housing 106 to capture images in the field of view of a user of the apparatus 102. The processor 110 may control the camera 120 to capture images (e.g., images that may form a video) and may access the captured images to track objects included in the captured images. As discussed in detail herein, the processor 110 may identify certain types of objects included in the captured images.

The spatial location tracking mechanism 122 may include components for tracking the spatial location of the apparatus 102. For instance, the spatial location tracking mechanism 122 may include an accelerometer that may detect accelerations of the apparatus 102 and a gyroscope that may detect rotational movements of the apparatus 102. In some examples, the spatial location tracking mechanism 112 may be integrated with the camera 120, an additional sensor, such as an infrared (IR) sensor, and/or the like. The processor 110 may access the detected accelerations and/or rotational movements detected by the spatial location tracking mechanism 122 to determine spatial location changes of the apparatus 102.

As discussed herein, the apparatus 102 may include a panel 104 on which images may be displayed for a user of the apparatus 102 to view. For instance, the apparatus 102 may include display components 108 that the processor 110 may control to display the images on the panel 104. The display components 108 may include any suitable components that may display data in the form of images on the panel 104. For instance, the display components 108 may include liquid crystal display (LCD) components on or embedded in the panel 104, light emitting diodes (LEDs), light projection components, and/or the like, that may project light of multiple colors onto the panel 104. The panel 104 may be any suitable type of screen on which and/or through which the images may be displayed, e.g., the panel 104 may be formed of a glass, a plastic, a ceramic, a combination thereof, and/or the like. For instance, the panel 104 may be a transparent or semi-transparent panel on which the images may be displayed such that a user may view real-world objects through the panel 104 in addition to the displayed images. The displayed images may thus provide augmented reality images on the panel 104.

Although not shown in FIG. 1A or 1B, the apparatus 102 may include other components such as a microphone to capture audio, a speaker to output audio, a visor to enhance display of images on the panel 104, a receptacle to receive a battery, a wireless transceiver, and/or the like.

As also shown in FIG. 1A, the system 100 may include a computing device 130 that may include a screen 132. In some examples, the computing device 130 may be a desktop computer, a laptop computer, a tablet computer, a smartphone, or the like. The screen 132 may be any suitable type of display or monitor on which the computing device 130 may display data in the form of items, e.g., text, images, etc. For instance, the screen 132 may be an LCD screen, a LED screen, a CRT screen, or the like.

Figure 2:
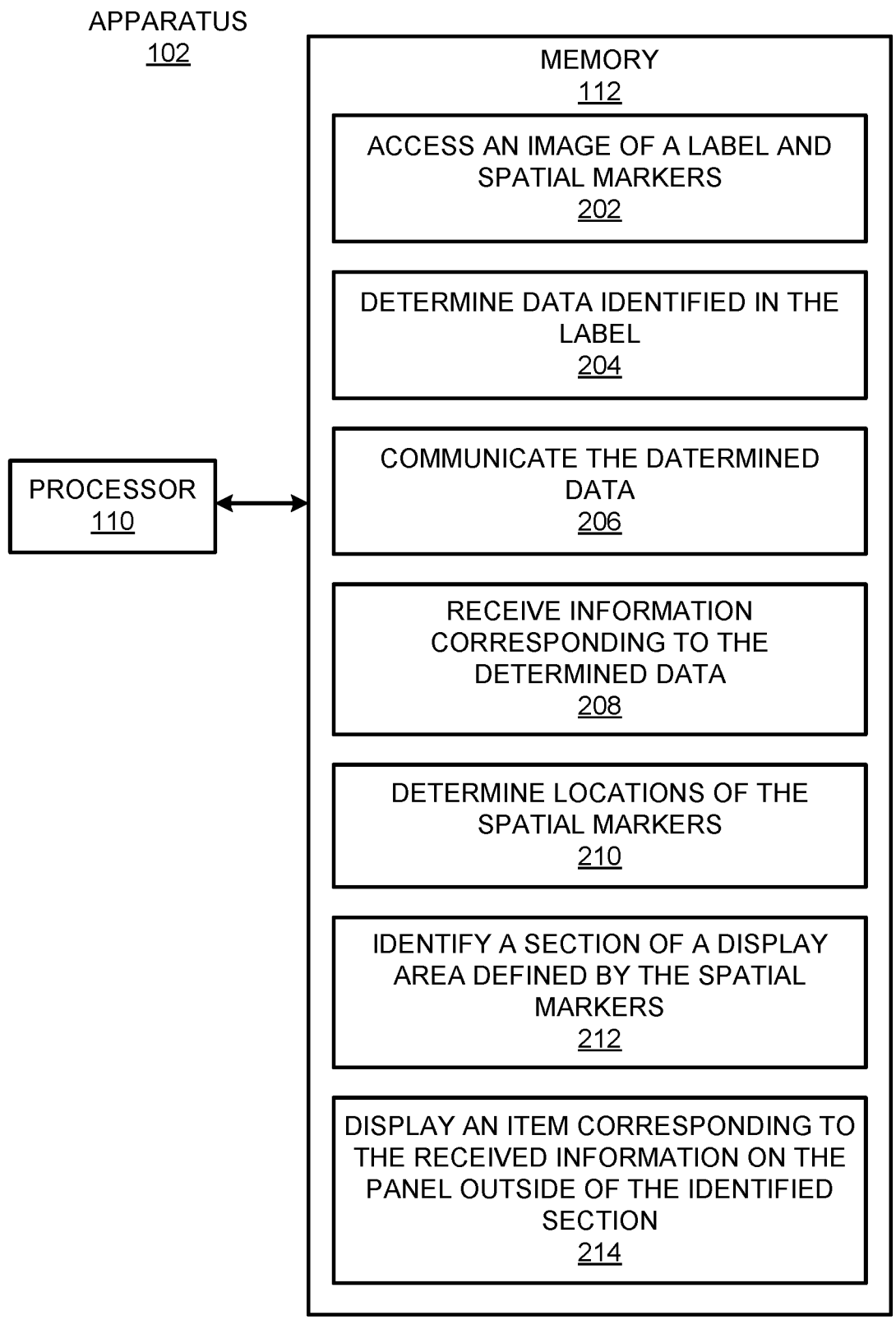
FIG. 2 shows a block diagram of the apparatus, and more particularly, the processor and the memory, depicted in FIGS. 1A and 1B, in accordance with an embodiment of the present disclosure.

Reference is now made to FIGS. 1A, 1B, and 2. FIG. 2 shows a block diagram of the apparatus 102, and more particularly, the processor 110 and the memory 112, depicted in FIGS. 1A and 1B in accordance with an embodiment of the present disclosure. It should be understood that the apparatus 102 may include additional features and that some of the features described herein may be removed and/or modified without departing from a scope of the apparatus 102.

As shown in FIG. 2, the memory 112 may have stored thereon machine-readable instructions 202-214 that the processor 110 may execute. Although the instructions 202-214 are described herein as being stored on a memory and may thus include a set of machine readable instructions, the apparatus 102 may include hardware logic blocks that may perform functions similar to the instructions 202-214. For instance, the processor 110 may include hardware components that may execute the instructions 202-214. In other examples, the apparatus 102 may include a combination of instructions and hardware logic blocks to implement or execute functions corresponding to the instructions 202-214. In any of these examples, the processor 110 may implement the hardware logic blocks and/or execute the instructions 202-214. As discussed herein, the apparatus 102 may also include additional instructions and/or hardware logic blocks such that the processor 110 may execute operations in addition to or in place of those discussed above with respect to FIG. 2.

The processor 110 may execute the instructions 202 to access a registration image 134 of a label 136 and spatial markers 138 displayed on a screen 132 of a computing device 130 as captured by the camera 120. According to examples, the computing device 130 may execute instructions that may cause the computing device 130 to display the registration image 134 on the screen 132. As such, the processor 110 may access an image captured by the camera 120 of the label 136 and the spatial markers 138 displayed on the screen 132 (as indicated by the arrow 140).

The label 136 may represent an identifier of the computing device 130. For instance, the label 136 may represent a network address, e.g., an Internet Protocol address, a name, a location, or the like, of the computing device 130. In addition, the label 136 may be in the form of a machine-readable code, e.g., a quick response code, a barcode, or the like. The spatial markers 138 may be any type of machine-visible markers that the processor 110 may identify in determining intended boundaries of the screen 132. For instance, the spatial markers 138 may have particular shapes, colors, shadings, text, and/or the like, that may distinguish the markers 138 from other displayed and/or real-world items. In addition, the computing device 130 may cause the spatial markers 138 to be displayed on the screen 132 at locations that define the boundaries, e.g., the four corners, of the screen 132 within which data is to be displayed. The spatial markers 138 may be positioned near the outer corners of the screen 132 or may be positioned at locations interior to the outer corners. In other examples, the spatial markers 138 may be markers that may be provided outside of the screen 132, e.g., on a frame of the screen 132.

The processor 110 may execute the instructions 204 to determine data identified in the label 136. The data identified in the label 136 may be the identifier of the computing device 130.

The processor 110 may execute the instructions 206 to communicate the identifier of the computing device 130 to an information source 150. The processor 110 may also communicate identification information, e.g., an identifier, a network address, or the like, of the apparatus 102 to the information source 150 such that the information source 150 may register the apparatus 102 with the computing device 130. The information source 150 may be a server that may host and execute an application, a service, or the like. As shown in FIG. 1A, the processor 110 may communicate the identifier of the computing device 130 via a network 160, which may be the Internet, an Intranet, a combination thereof, or the like. In some examples and as shown in FIG. 1B, the apparatus 102 may also include a network interface 124 through which the processor 110 may communicate over the network. The network interface 124 may include hardware and/or software that may enable the communications.

The processor 110 may execute the instructions 208 to receive information corresponding to the identifier of the computing device 130 from the information source 150. The information corresponding to the identifier may pertain to information that the computing device 130 is currently processing, e.g., displaying on the screen 132, an application that the computing device 130 is currently executing, or the like. In addition, or alternatively, the information corresponding to the identifier may include an identification of the computing device 130, a notification that the apparatus 102 is paired with the computing device 130, and/or the like.

The processor 110 may execute the instructions 210 to determine locations of the spatial markers 138 displayed on the computing device screen 132 with respect to a display area of the panel 104. That is, the processor 110 may determine the locations of the spatial markers 138 with respect to, e.g., within, a display area of the panel 104 based on images collected by the camera 120.

The processor 110 may execute the instructions 212 to identify a section 142 of a display area on the panel 104 defined by the spatial markers 138. That is, the processor 110 may identify a section 142 of the panel 104 corresponding to a boundary formed by the spatial markers 138 visible through the panel 104. The processor 110 may identify the section 142 based on input received from the camera 120 and the spatial location tracking mechanism 122. For instance, the processor 110 may employ a suitable object tracking process to track the locations of the spatial markers 138 with respect to the apparatus 102 to identify the location of the identified section 142 on the panel 104. In addition, the processor 110 may position the identified section 142 on the panel 104 that may correspond to the location of the screen 132 visible through the panel 104. As such, in instances in which the apparatus 102 is not directed toward the screen 132 such that the spatial markers 138 are outside of a field of view of the camera 120 and/or positioned outside of the perimeter of the panel 104, the identified section 142 may not be included on the panel 104.

The processor 110 may execute the instructions 214 to display an item 144 corresponding to the received information on the panel 104 outside of the identified section 142. The item 144 may be related to or may otherwise correspond to the received information. For instance, the received information may instruct the processor 110 to display an item 144, e.g., a thumbnail of a document, a low resolution version of a document, a particular object, or the like. In some examples, the received information and thus, the item 144, may correspond to an application or other operation that the computing device 130 may be executing and/or displaying. By way of particular example in which the computing device 130 may currently be executing an application in which a particular document is being displayed at a first resolution, the received information may include the particular document and/or another document or item that may correspond to the particular document. For instance, the computing device 130 may cause a version of the document to be displayed on the screen 132 at a first resolution and the received information may cause the processor 110 to display a version of the document to be displayed on the panel 104 at a second resolution, in which the second resolution may be lower than the first resolution.

In another example, the computing device 130 may currently be displaying an object of a video game, a music application, a video streaming service, and/or the like, and the received information from the information source 150 may cause the processor 110 to display an item 144 that corresponds to the displayed object. For instance, the item 144 may include information that is supplemental to the displayed object.

In any of the examples discussed herein, the processor 110 may prevent the item 144 from being displayed within the identified section 142. The processor 110 may further prevent any data from being displayed within the identified section 142 such that, for instance, a view of the screen 132 through the panel 104 may not be occluded. In other words, the processor 110 may prevent images from being displayed on the identified section 142.

Figure 3A:
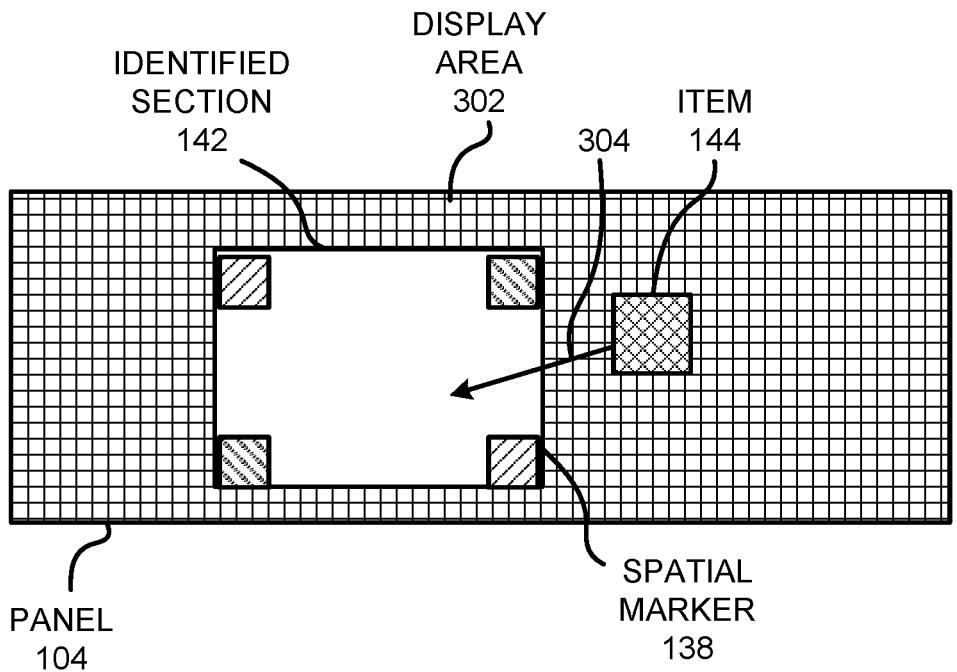
FIGS. 3A and 3B, respectively, show diagrams of the panel depicted in FIGS. 1A and 1B in which the screen may be visible through an identified section of the panel, in accordance with an embodiment of the present disclosure.
Figure 3B:
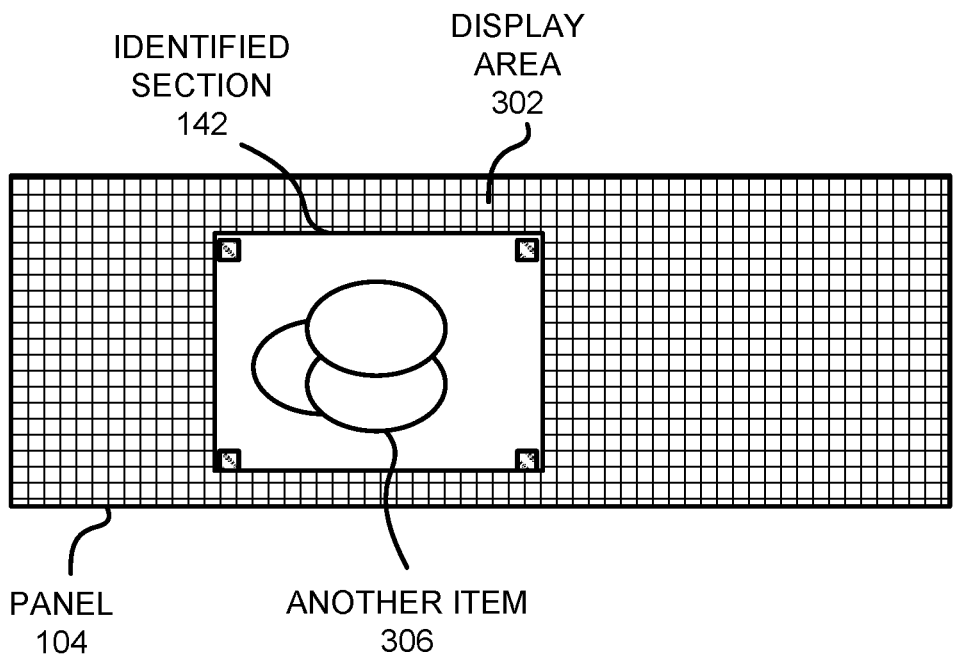

Turning now to FIGS. 3A and 3B, there are respectively shown diagrams of the panel 104 depicted in FIGS. 1A and 1B in which the screen 132 may be visible through an identified section 142 of the panel 104, in accordance with an embodiment of the present disclosure. Particularly, FIGS. 3A and 3B respectively show views of a display area 302 of the panel 104 while a user is viewing and/or looking through the panel 104. As shown, the processor 110 may cause data to be displayed on the panel 104 at an area that is outside of the identified section 142. In this regard, for instance, the processor 110 may cause the display components 108 to display an item 144 at a location on the panel 104 outside of the identified section 142. In addition, the processor 110 may cause the display components 108 to keep the identified section 142 clear or void of any images such that, for instance, a user may see the screen 132 through the identified section 142. As shown in FIG. 3A, the spatial markers 138 displayed on the screen 132 may be visible through the identified section 142.

In addition, although not shown, the processor 110 may control the display components 108 to display a cursor or other element that a user may move and through which the user may control the display of the item 144. That is, the camera 120 may track a user's hand movements and the processor 110 may control the display of the item 144 based on the tracked movements. In other examples, the user may control the display via voice commands, manipulation of an input device, head movements, and/or the like.

In any of the examples discussed above, a user may cause the item 144 to be moved from the display area 302 to the identified section 142 as denoted by the arrow 304. The processor 110 may thus receive a user input to move the item 144 from a location outside of the identified section 142 to an area inside the identified section 142. Based on receipt of this user input, the processor 110 may output an indication of the user input to the information source 150 and the information source 150 may output an instruction to the computing device 130 to display on the screen 132 of the computing device 130 the item 144 and/or another item 306 (FIG. 3B) corresponding to the item 144.

As shown in FIG. 3B, the item 144 may no longer be displayed on the panel 104 and instead, another item 306 may be displayed on the screen 132. The another item 306 as displayed on the screen 132 may be visible through the identified section 142 as no images may be displayed in the identified section 142. In an example, the another item 306 may be an object, e.g., a document, a webpage, a streaming service website, or the like, that was being displayed on the screen 132 prior to the apparatus 102 being registered with the computing device 130. In addition or in another example, the another item 306 may be a higher resolution version of the item 144 such that, for instance, the user may better view information included in the item 144, the user may better manipulate information included in the item 144, and/or the like. As another example, the item 144 may display information at a first detail level and the another item 306 may display information at a second detail level, in which the second detail level may be a higher detail level than the first detail level.

In addition to the examples discussed above, a user may cause the another item 306 to be moved from the identified section 142 to the display area 302. The computing device 130 may thus receive a user input to move the another item 306 from a location inside of the identified section 142 to an area inside of the identified section 142. Based on receipt of this user input, the computing device 130 may output an indication of the user input to the information source 150 and the information source 150 may output an instruction to the processor 110 to display in the display area 302 of the panel 104 the item 144 (FIG. 3A) corresponding to the another item 306. The information source 150 may include instructions for a modified version of the item 144 to be displayed by the processor 110.

In any regard, a user may move the another item 306 from the identified section 142 to the display area 302 of the panel 104 for any of a number of various reasons. For instance, the user may move the another item 306 for privacy reasons as others may not be able to view data being displayed on the panel 104. As another example, the user may move the another item 306 to clear up space on the screen 132 while maintaining the item 144 in a conveniently accessible location.

Figure 4:
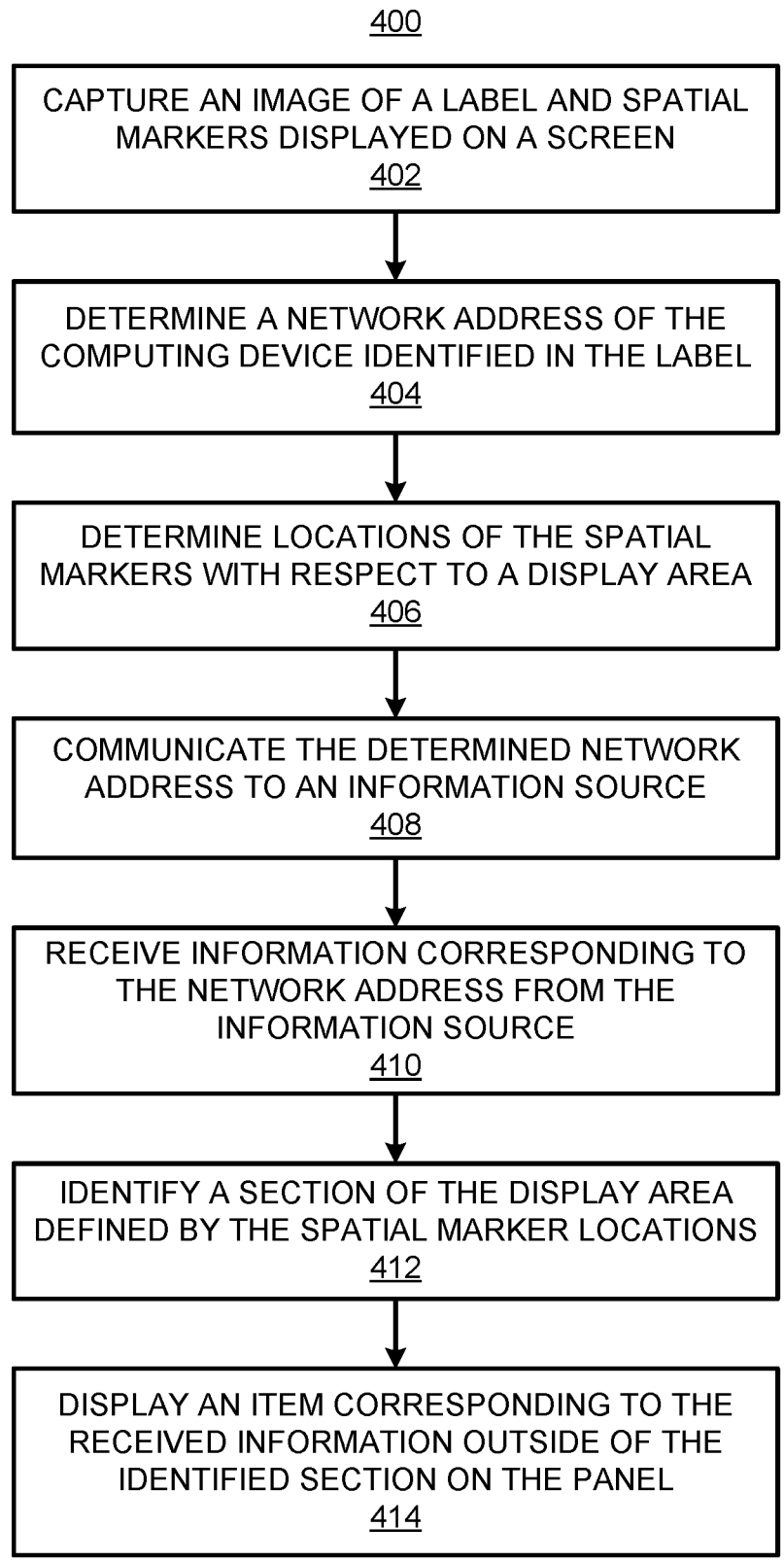
FIG. 4 depicts a flow diagram of a method for registering a head-mountable apparatus with a computing device and controlling display of items on a panel of the head-mountable apparatus and a screen of the computing device, in accordance with an embodiment of the present disclosure.

Various manners in which the processor 110 of the apparatus 102 may operate are discussed in greater detail with respect to the method 400 depicted in FIG. 4. Particularly, FIG. 4 depicts a flow diagram of a method 400 for registering a head-mountable apparatus 102 with a computing device 130 and controlling display of items 144, 306 on a panel 104 of the head-mountable apparatus 102 and a screen 132 of the computing device 130, in accordance with an embodiment of the present disclosure. It should be understood that the method 400 depicted in FIG. 4 may include additional operations and that some of the operations described therein may be removed and/or modified without departing from the scope of the method 400. The description of the method 400 is made with reference to the features depicted in FIGS. 1A-3B for purposes of illustration.

At block 402, the processor 110 may cause the camera 120 to capture an image of a label 136 and spatial markers 138 displayed on a screen 132 of a computing device 130. As discussed herein, the processor 110 and the camera 120 may be mounted on or in a housing 106 of a head-mountable apparatus 102.

At block 404, the processor 110 may determine a network address of the computing device 130 identified in the label 136. That is, the label 136 may include a machine-readable code that includes data that may identify the computing device 130, e.g., among other computing devices 130 connected to a network. The data may be the network address, e.g., an IP address assigned to the computing device 130.

At block 406, the processor 110 may determine locations of the spatial markers 138 with respect to a display area 302 of a panel 104 on the head-mountable apparatus 102. That is, for instance, the processor 110 may track the locations of the spatial markers 138 from the perspective of a user as may be viewed by the user through the panel 104. The processor 110 may employ object tracking operations to track the spatial marker 138 locations on the panel 104.

At block 408, the processor 110 may communicate the determined network address of the computing device 130 to an information source 150. The processor 110 may communicate the network address of the computing device 130 to the information source 150 via a network 160. In response to receipt of the network address from the processor 110, the information source 150 may determine information corresponding to the network address. As discussed herein, the information corresponding to the network address may correspond to an application that may currently be executing on the computing device 130, data that the computing device 130 may currently be processing, images that may currently be displayed on the screen 132, and/or the like.

At block 410, the processor 110 may receive the information corresponding to the network address from the information source 150. The processor 110 may receive the information corresponding to the network address from the information source 150 via the network 160.

At block 412, the processor 110 may identify a section 142 of the display area 302 of the panel 104 defined by the locations of the spatial markers 138. The identified section 142 may correspond to boundaries defined by the locations of the spatial markers 138 as the spatial markers 138 may be viewable through the panel 104. In addition, the identified section 142 may move and/or be resized with respect to the display area 302 as the relative positions and/or orientations of the head-mountable apparatus 102 and the screen 132 may vary. That is, the processor 110 may cause the identified section 142 to move in a manner that may coincide with movement of the camera 120 with respect to the locations of spatial markers 138, which may include moving the identified section 142 outside of the display area 302 when the positions of the spatial markers 138 move outside of a viewing area of the camera 120.

At block 412, the processor 110 may display an item 144 corresponding to the received information on the panel 104 outside of the identified section 142. An example of the item 144 being displayed outside of the identified section 142 is shown in FIG. 3A. In addition, the processor 110 may block display of images in the identified section 142 of the display area 302 of the panel 104 defined by the locations of the spatial markers 138. As also discussed above with respect to FIGS. 3A and 3B, the processor 110 may receive a user input to move the displayed item 144 from a location outside of the identified section 142 to an area inside of the identified section 142 and may output an indication of the user input to the information source 150. In response to receipt of the indication of the user input, the information source 150 may output an instruction to the computing device 130 to display on the screen 132 of the computing device 130 the item 144 and/or another item 306 corresponding to the item 144.

As further described with respect to FIGS. 3A and 3B, a user may input a second user input to the computing device 130 to move the item 144 and/or the another item 306 displayed on the screen 132 to a location outside of the screen 132. In response, the computing device 130 may communicate an indication of the second user input to the information source 150. In response to receipt of the indication of the second user input, the information source 150 may output an instruction to the processor 110 to display on the display area 302 of the panel 104 the item 144 and/or another item 306 corresponding to the item 144. In addition, the processor 110 may receive an indication from the information source 150 of the second user input to move the item 144 and/or the another item 306 from the computing device screen 132 to a location outside of the identified section 142. Moreover, based on receipt of the indication from the information source 150, the processor 110 may cause the display components 108 to display the item 144 and/or the another item 306 on the panel 104 outside of the identified section 142.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a housing to be mounted on a user's head;
   a camera, a transparent panel, and a processor being mounted on the housing;
   wherein the processor is to:
   access an image captured by the camera of a label and spatial markers displayed on a screen of a computing device;
   determine data identified in the label;
   communicate the determined data to an information source;
   receive, from the information source, information corresponding to the determined data;
   determine locations of the spatial markers with respect to a display area of the panel;
   identify a section of the display area defined by the spatial markers;
   display an item corresponding to the received information on the panel outside of the identified section;
   receive a user input to move display of the item from a location outside of the identified section to an area inside of the identified section; and
   output an indication of the user input to the information source, the information source to output an instruction to the computing device to display on the screen of the computing device the item and/or another item corresponding to the item.

2. The apparatus of claim 1, wherein the label includes a machine-readable code that identifies an identifier of the computing device, the determined data comprising the identifiers of the computing device.

3. The apparatus of claim 2, wherein the identifier comprises a network address of the computing device.

4. The apparatus of claim 1, further comprising:
   a spatial location tracking mechanism mounted on the housing; and
   wherein the processor is to:
   use spatial information collected by the spatial locating tracking mechanism and the spatial markers to track the locations of the spatial markers.

5. The apparatus of claim 1, wherein the processor is to:
   receive an indication from the information source of a second user input to move the item and/or the another item from the computing device screen to a location outside of the identified section; and
   based on receipt of the indication from the information source, display the item and/or the another item on the panel outside of the identified section.

6. The apparatus of claim 1, wherein the item comprises a first detail level and the another item comprises a second detail level, the second detail level being a higher detail level than the first detail level.

7. The apparatus of claim 6, wherein the instruction is to cause the computing device to display on the screen of the computing device the another item corresponding to the item at the second detail level.

8. A system comprising:
a head-mountable apparatus; and
a camera, a panel, and a processor being mounted on the head-mountable apparatus,
wherein the processor is to:
   access a registration image of a label and spatial markers displayed on a screen of a computing device as captured by the camera, the label representing an identifier of the computing device;
   communicate the identifier of the computing device to an information source;
   receive information corresponding to the identifier of the computing device from the information source;
   determine a boundary of the computing device screen with respect to a display area of the panel based on the spatial markers;
   display an item corresponding to the received information on the panel outside of the determined boundary in the display area;
   receive a user input to move the item from a location outside of the determined boundary to an area inside of the determined boundary; and
   output an indication of the user input to the information source, the information source to output an instruction to the computing device to display on the screen of the computing device the item and/or another item corresponding to the item.

9. The system of claim 8, wherein the identifier comprises a network address of the computing device.

10. The system of claim 8, further comprising:
a spatial location tracking mechanism mounted on the head-mountable apparatus; and
wherein the processor is to:
   use spatial information collected by the spatial locating tracking mechanism and the spatial markers to track the locations of the spatial markers.

11. The system of claim 8, wherein the information source is to:
receive, from the computing device, a second user input to move the item and/or the another item from the computing device screen to a location outside of the computing device screen; and
based on receipt of the second user input, output, to the head-mountable apparatus, an indication that the head-mountable apparatus is to display the item and/or the another item on the panel.

12. The system of claim 11, wherein the processor is to:
receive, from the information source, the indication that the head-mountable apparatus is to display the item and/or the another item on the panel; and
based on receipt of the indication from the information source, display the item and/or the another item on the panel outside of the determined boundary.

13. The system of claim 8, wherein the item comprises a first detail level and the another item comprises a second detail level, the second detail level being a higher detail level than the first detail level.

14. The system of claim 13, wherein the instruction is to cause the computing device to display on the screen of the computing device the another item corresponding to item at the second detail level.

15. A method comprising:
capturing, by a camera on a head-mountable apparatus, an image of a label and spatial markers displayed on a screen of a computing device;
determining, by a processor on the head-mountable apparatus, a network address of the computing device identified in the label;
determining, by the processor, locations of the spatial markers with respect to a display area of a panel on the head-mountable apparatus;
communicating, by the processor, the determined network address to an information source;
receiving, by the processor, information corresponding to the network address from the information source;
identifying, by the processor, a section of the display area of the panel defined by the locations of the spatial markers;
displaying, by the processor, an item corresponding to the received information on the panel outside of the identified section;
receiving a user input to move the displayed item from a location outside of the identified section to an area inside of the identified section; and
outputting an indication of the user input to the information source, the information source to output an instruction to the computing device to display on the screen of the computing device the item and/or another item corresponding to the item.

16. The method of claim 15, further comprising:
blocking display of images in the identified section of the display area of the panel defined by the locations of the spatial markers; and
moving the identified section to coincide with movement of the camera with respect to the locations of spatial markers.

17. The method of claim 15, further comprising:
receiving an indication from the information source of a second user input to move the item and/or the another item from the computing device screen to a location outside of the identified section; and
based on receipt of the indication from the information source, display the item and/or the another item on the panel outside of the identified section.

* * * * *